United States Patent
Ye et al.

(10) Patent No.: US 10,485,017 B2
(45) Date of Patent: Nov. 19, 2019

(54) DEVICE AND METHOD OF HANDLING A SCHEDULE REQUEST

(71) Applicant: HTC Corporation, Taoyuan (TW)

(72) Inventors: Shiang-Rung Ye, Taoyuan (TW); Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/990,844

(22) Filed: May 29, 2018

(65) Prior Publication Data

US 2018/0352567 A1 Dec. 6, 2018

Related U.S. Application Data

(60) Provisional application No. 62/512,714, filed on May 30, 2017.

(51) Int. Cl.
*H04B 7/00* (2006.01)
*H04W 72/12* (2009.01)
*H04W 72/14* (2009.01)

(52) U.S. Cl.
CPC ....... *H04W 72/1284* (2013.01); *H04W 72/14* (2013.01)

(58) Field of Classification Search
CPC ............. H04W 72/04; H04W 72/0413; H04W 72/048; H04W 72/1242
USPC .......................................... 370/310, 328, 329
See application file for complete search history.

(56) References Cited

U.S. PATENT DOCUMENTS

| 8,982,780 | B2 * | 3/2015 | Hsu | H04W 72/1284 |
|---|---|---|---|---|
| | | | | 370/328 |
| 9,167,594 | B2 * | 10/2015 | Hsu | H04W 72/1221 |
| 9,307,553 | B2 * | 4/2016 | Ostergaard | H04W 72/1284 |
| 9,930,596 | B2 * | 3/2018 | Choi | H04W 28/24 |
| 2015/0117342 | A1 | 4/2015 | Loehr | |
| 2018/0324820 | A1 * | 11/2018 | Ye | H04W 72/1284 |
| 2018/0324867 | A1 * | 11/2018 | Basu Mallick | H04W 72/1242 |
| 2018/0352567 | A1 * | 12/2018 | Ye | H04W 72/1284 |

(Continued)

FOREIGN PATENT DOCUMENTS

EP 2182770 A2 5/2010

OTHER PUBLICATIONS

3GPP TS 36.321 V14.2.1 (Mar. 2017).
(Continued)

*Primary Examiner* — Dmitry Levitan
(74) *Attorney, Agent, or Firm* — Winston Hsu

(57) ABSTRACT

A communication device of handling a schedule request (SR) comprises a storage device and a processing circuit, coupled to the storage device. The storage device stores, and the processing circuit is configured to execute instructions of: receiving a first configuration of a first logical channel (LC), a second configuration of a second LC, a first SR configuration corresponding to the first LC, and a second SR configuration corresponding to the second LC from a base station (BS); transmitting a first buffer status report (BSR); starting a BSR retransmission timer (retxBSR-Timer) in response to the transmission of the first BSR; transmitting a SR to the BS according to the first SR configuration, when the retxBSR-Timer expires, the first LC has first data available for being transmitted, and a first priority of the first LC is higher than a second priority of the second LC.

9 Claims, 5 Drawing Sheets

(56) References Cited

U.S. PATENT DOCUMENTS

2018/0368159 A1* 12/2018 Wu .................. H04W 72/1284
2019/0150024 A1*  5/2019 Ye .................... H04W 72/1205

OTHER PUBLICATIONS

3GPP TR 38.804 V14.0.0 (Mar. 2017).
3GPP TR 38.913 V14.2.0 (Mar. 2017).
Report of 3GPP TSG RAN WG2 meeting #98 Hangzhou, China, May 2017.
Report of 3GPP TSG RAN WG2 meeting #97bis Spokane, USA, Apr. 2017.
Report of 3GPP TSG RAN WG2 meeting #97 Athens, Greece, Feb. 2017.
Report of 3GPP TSG RAN WG2 AdHoc on NR Spokane, USA, Jan. 2017.
3GPP TR 22.862 V14.1.0, Sep. 2016.
Office action dated Jan. 19, 2019 for the Taiwan application No. 107118460, filing date May 30, 2018, pp. 1-11.
Search Report dated Oct. 9, 2018 for EP application No. 18174989.6, pp. 1-5.
Intel Corporation, "Enhancements of SR/BSR in NR", 3GPP TSG RAN WG2 Meeting #97bis, R2-1703422, Mar. 3-7, 2017, Spokane, US, XP051245278, pp. 1-4.
Office action dated May 23, 2019 for EP application No. 18174989.6, pp. 1-7.
3GPP TS 36.321 V14.2.1 (Mar. 2017), "3rd Generation Partnership Project; Technical Specification Group Radio Access Network; Evolved Universal Terrestrial Radio Access (E-UTRA); Medium Access Control (MAC) protocol specification (Release 14)", XP055566698, pp. 1-106.

* cited by examiner

DEVICE AND METHOD OF HANDLING A SCHEDULE REQUEST

CROSS REFERENCE TO RELATED APPLICATIONS

This application claims the benefits of U.S. Provisional Applications No. 62/512,714 filed on May 30, 2017, which is incorporated herein by reference.

BACKGROUND OF THE INVENTION

1. Field of the Invention

The present invention relates to a device and a method used in a wireless communication system, and more particularly, to a device and a method of handling a schedule request.

2. Description of the Prior Art

A user equipment (UE) transmits a buffer status report (BSR), and starts a BSR retransmission timer. Transmission of a schedule request (SR) is triggered by the UE, when the BSR retransmission timer expires and the UE does not have uplink (UL) radio resources for transmitting the BSR.

SUMMARY OF THE INVENTION

The present invention therefore provides a method and related communication device for handling a schedule request to solve the abovementioned problem.

A communication device of handling a schedule request (SR) comprises a storage device and a processing circuit, coupled to the storage device. The storage device stores, and the processing circuit is configured to execute instructions of: receiving a first configuration of a first logical channel (LC), a second configuration of a second LC, a first SR configuration corresponding to the first LC, and a second SR configuration corresponding to the second LC from a base station (BS); transmitting a first buffer status report (BSR); starting a BSR retransmission timer (retxBSR-Timer) in response to the transmission of the first BSR; transmitting a SR to the BS according to the first SR configuration, when the retxBSR-Timer expires, the first LC has first data available for being transmitted, and a first priority of the first LC is higher than a second priority of the second LC.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
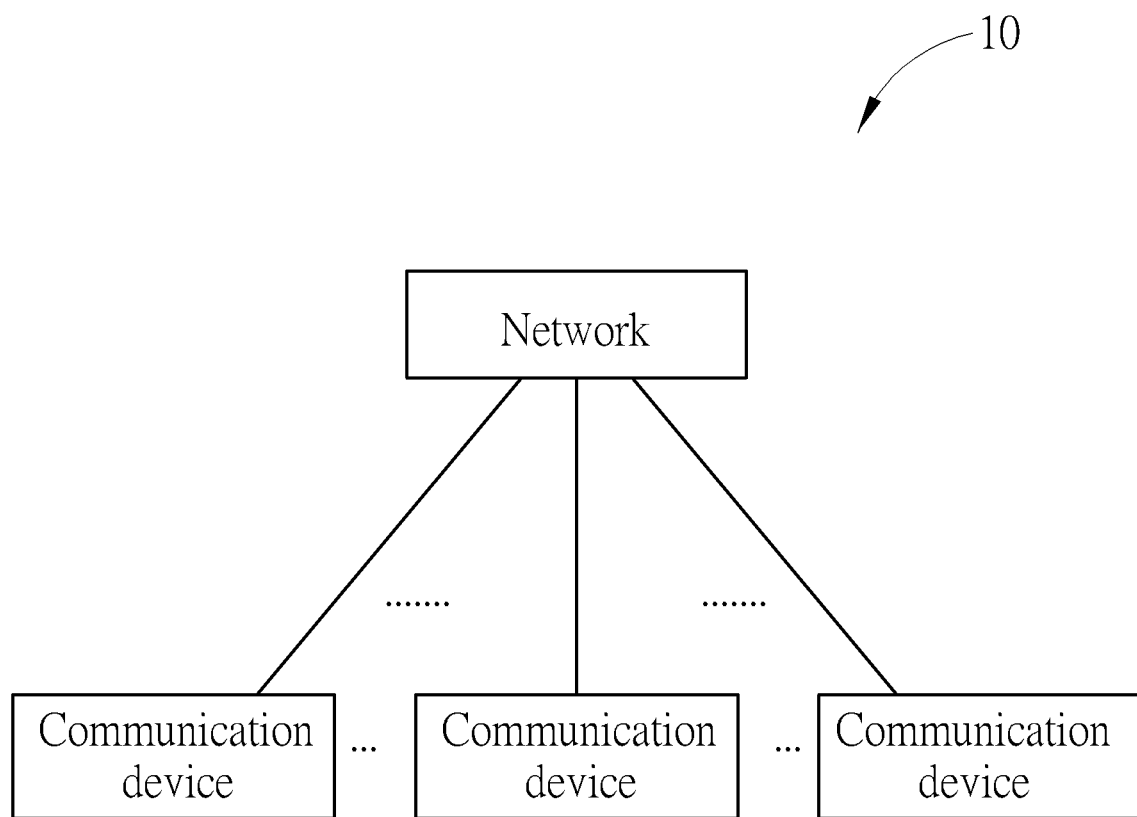
FIG. 1 is a schematic diagram of a wireless communication system according to an example of the present invention.

In FIG. 1, the wireless communication system 10 is briefly composed of a network and a plurality of communication devices. The network and the communication device may (e.g., simultaneously) communicate with each other via one or multiple cells including a primary cell (PCell) and one or more secondary cells (SCells).

Practically, the network in FIG. 1 may comprise a narrowband internet of things (NB-IoT) network or an evolved universal terrestrial radio access network (E-UTRAN) including at least one evolved Node-B (eNB). The network may comprise a new radio (NR)/next generation (NextGen) network including at least one 5G base station (BS) (or called gNB) or an evolved gNB (egNB) or a sixth generation (6G) BS. The 5G/6G radio communication technology may employ orthogonal frequency-division multiplexing (OFDM) and/or non-OFDM. In general, a BS may also be used to refer any of the eNB, the gNB, the egNB and the 6G BS.

A communication device may be a user equipment (UE), a NB-IoT UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a uplink (UL), the communication device is the transmitter and the network is the receiver, and for a downlink (DL), the network is the transmitter and the communication device is the receiver.

Figure 2:
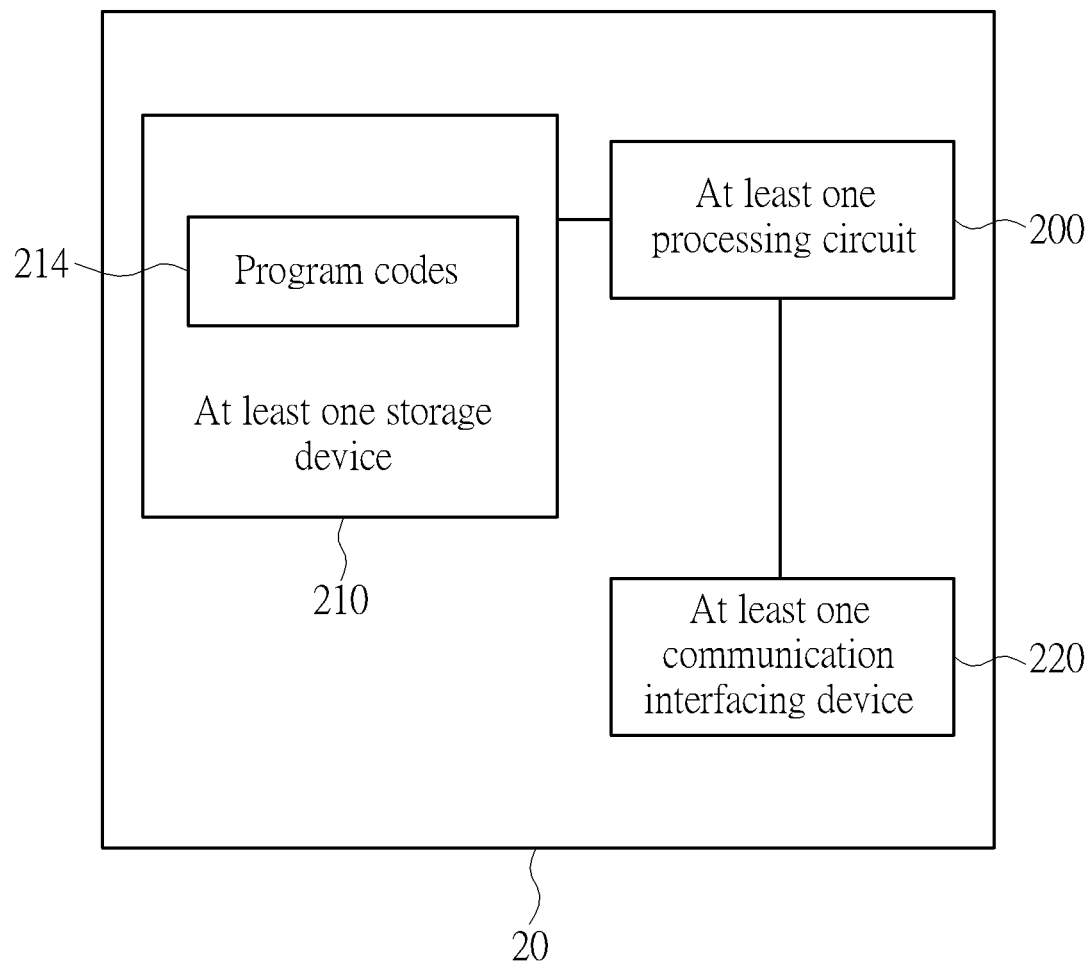
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 215, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

Figure 3:
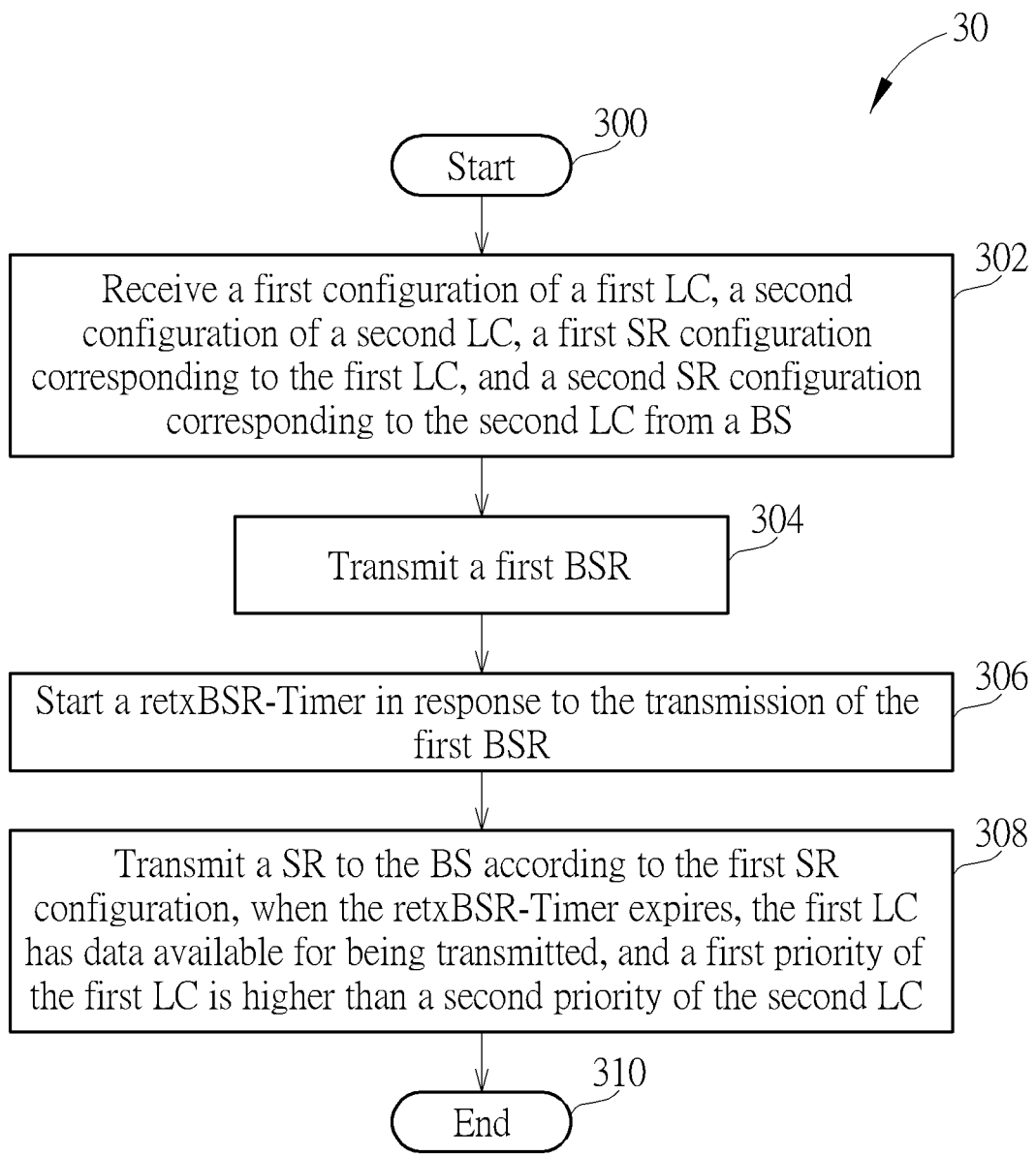
FIG. 3 is a flowchart of a process according to an example of the present invention.

A process 30 in FIG. 3 is utilized in a UE, and includes the following steps:

Step 300: Start.

Step 302: Receive a first configuration of a first logical channel (LC), a second configuration of a second LC, a first SR configuration corresponding to the first LC, and a second SR configuration corresponding to the second LC from a BS.

Step 304: Transmit a first BSR.

Step 306: Start a BSR retransmission timer (retxBSR-Timer) in response to the transmission of the first BSR.

Step 308: Transmit a SR to the BS according to the first SR configuration, when the retxBSR-Timer expires, the first LC has data available for being transmitted, and a first priority of the first LC is higher than a second priority of the second LC.

Step 310: End.

In one example, the second LC has data available for being transmitted as well. According to the process 30, the UE transmits the SR to the BS according to (e.g., by using) a SR configuration corresponding to (e.g., associated to) a LC which has a higher priority (or the highest priority) among LCs which may or may not have data available for being transmitted. In one example, the UE does not use the second SR configuration to transmit the SR in Step 308.

In one example, the UE transmits the SR to the BS according to the second SR configuration, when the retxBSR-Timer expires, the second LC has data available for being transmitted and the first LC does not have data available for being transmitted. That is, the UE transmits the SR to the BS according to the second SR configuration corresponding to the second LC which has data available for be transmitted, even the first LC has a higher priority than the second LC.

In one example, the UE transmits (e.g., determines to transmit) the SR to the BS according to at least one UL radio resource configured by the (first/second) SR configuration, if the UE uses the (first/second) SR configuration. In one example, the at least one UL radio resource includes at least one of at least one time resource (e.g., periodicity, OFDM symbol, minislot, slot or subframe), at least one frequency resource (e.g., subcarrier) and at least one sequence (e.g., orthogonal code). In one example, the (first/second) SR configuration indicates at least one numerology to the UE. In one example, the at least one UL radio resource and/or the at least one numerology are (e.g., newly) defined in the 3GPP standard.

In one example, the UE determines (e.g., counts) a number of transmissions of the SR according to (e.g., by using) a counter. For example, the counter is incremented by 1 in response to the transmission of the SR. In one example, the counter includes (or is) a SR COUNTER. In one example, the SR COUNTER is (e.g., newly) defined in the 3GPP standard.

In one example, the UE does not transmits (e.g., determines not to transmit) a second BSR to the BS, when the retxBSR-Timer expires, and both the first LC and the second LC do not have data available for being transmitted. Thus, the UE does not transmit a SR to the BS.

In one example, the UE transmits (e.g., determines to transmit) a second BSR to the BS and does not transmit a SR to the BS (i.e., the SR is not triggered), when the retxBSR-Timer expires and both the first LC and the second LC do not have data available for being transmitted. In one example, the transmission of the second BSR is triggered by an expiry of a periodic BSR timer started by the UE. In both examples, the UE may wait for the BS to configure (e.g., assign) at least one UL radio resource to the UE, to transmit the second BSR. For example, the BS may transmit a DL control information (DCI) on a physical DL control channel (PDCCH) to the UE. The DCI configures a UL grant and indicates a transmission time interval (TTI). The UE transmits the second BSR in the TTI by using the UL grant.

In one example, a first TTI is configured by the first SR configuration and a second TTI is configured by the second SR configuration. The first TTI and the second TTI may be nearby and after a time instant that the UE transmits the SR to the BS according to the first SR configuration. The first TTI may be later than the second TTI in a timeline. The UE may transmit the SR in the first TTI.

In one example, the UE transmit the SR in the second TTI according to the second SR configuration, if the first LC and the second LC have the same priority.

In one example, the UE starts a first (or second) SR prohibit timer in response to the transmission of the SR. The UE may be prohibited from transmitting any SR according to the first (or second) SR configuration, when the first (or second) SR prohibit timer is running. The first (or second) SR configuration may configure a first (or second) timer value of the first (or second) SR prohibit timer.

In one example, the UE receives a UL grant transmitted by the BS in response to the transmission of the SR. In one example, the UE transmits the first (or second) BSR to the BS in at least one UL radio resource configured by the UL grant.

Figure 4:
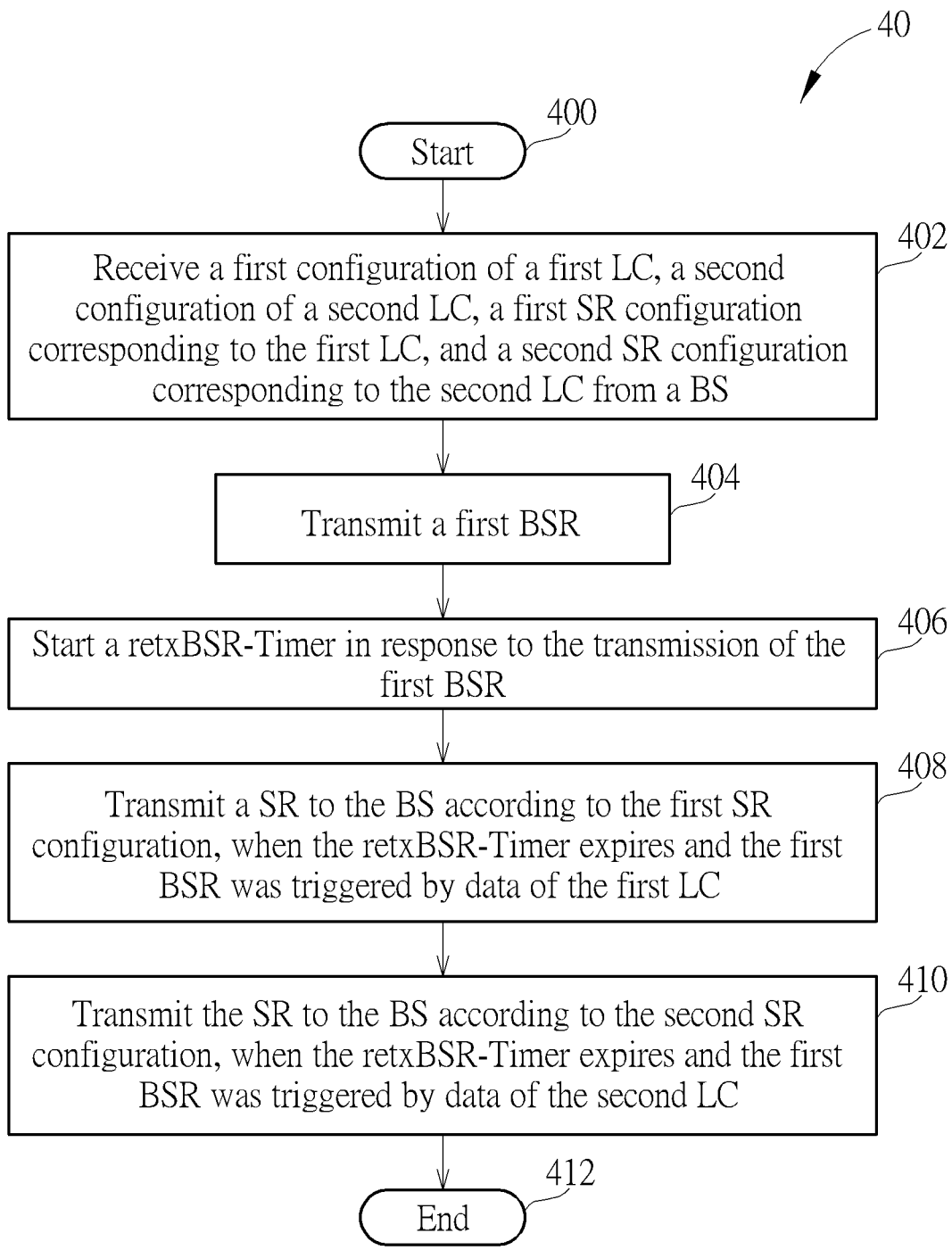
FIG. 4 is a flowchart of a process according to an example of the present invention.

A process 40 in FIG. 4 is utilized in a UE, and includes the following steps:

Step 400: Start.

Step 402: Receive a first configuration of a first LC, a second configuration of a second LC, a first SR configuration corresponding to the first LC, and a second SR configuration corresponding to the second LC from a BS.

Step 404: Transmit a first BSR.

Step 406: Start a retxBSR-Timer in response to the transmission of the first BSR.

Step 408: Transmit a SR to the BS according to the first SR configuration, when the retxBSR-Timer expires and the first BSR was triggered by data of the first LC.

Step 410: Transmit the SR to the BS according to the second SR configuration, when the retxBSR-Timer expires and the first BSR was triggered by data of the second LC.

Step 412: End.

According to the process 40, the UE transmits the SR to the BS according to a SR configuration corresponding to a LC which has data available for being transmitted and triggers the first BSR. Examples described for the process 30 may be applied to the process 40.

Figure 5:
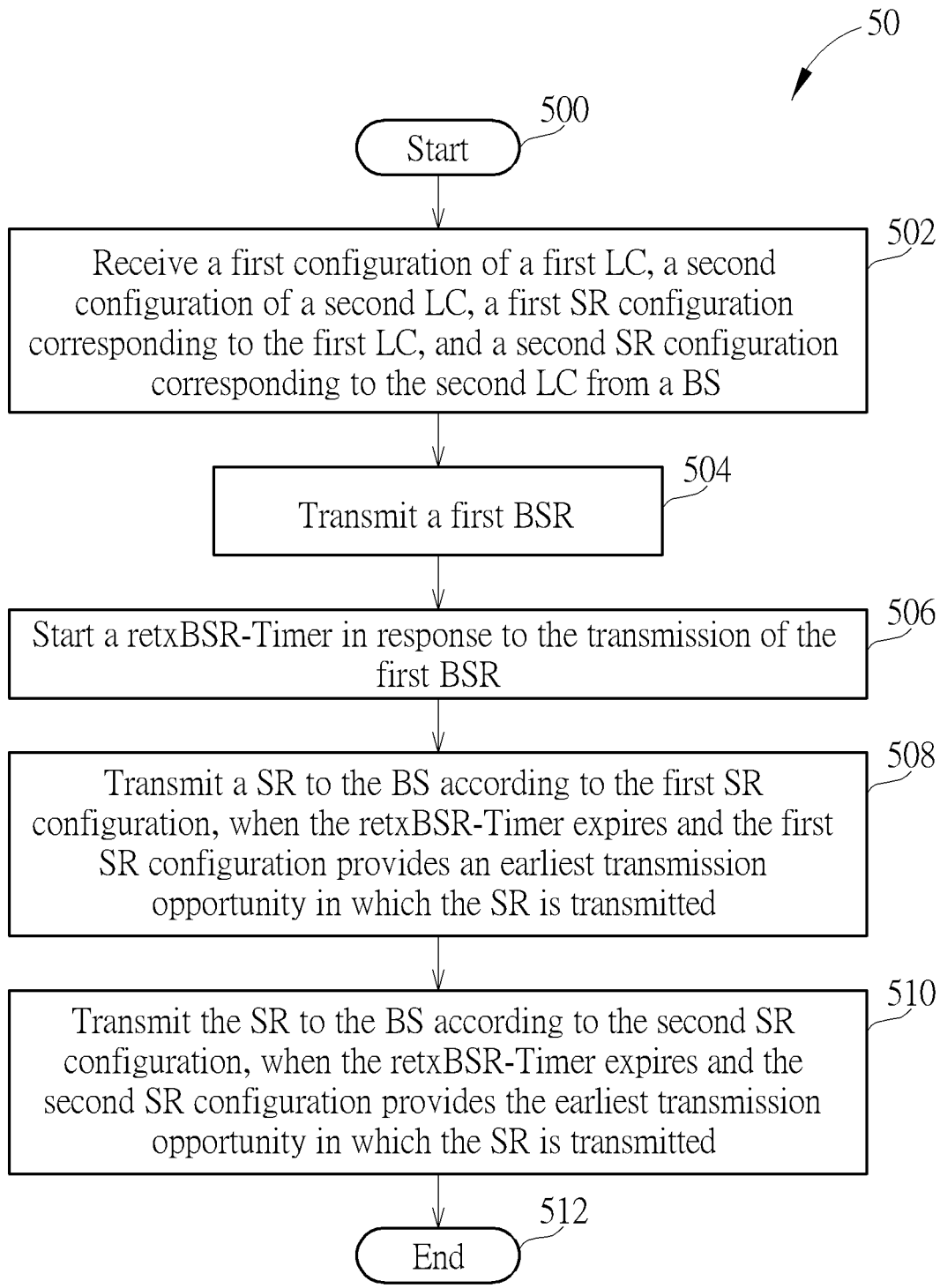
FIG. 5 is a flowchart of a process according to an example of the present invention.

A process 50 in FIG. 5 is utilized in a UE, and includes the following steps:

Step 500: Start.

Step 502: Receive a first configuration of a first LC, a second configuration of a second LC, a first SR configuration corresponding to the first LC, and a second SR configuration corresponding to the second LC from a BS.

Step 504: Transmit a first BSR.

Step 506: Start a retxBSR-Timer in response to the transmission of the first BSR.

Step 508: Transmit a SR to the BS according to the first SR configuration, when the retxBSR-Timer expires and the first SR configuration provides an earliest transmission opportunity in which the SR is transmitted.

Step 510: Transmit the SR to the BS according to the second SR configuration, when the retxBSR-Timer expires and the second SR configuration provides the earliest transmission opportunity in which the SR is transmitted.

Step 512: End.

According to the process 50, the UE transmits the SR to the BS according to a SR configuration configuring the earliest (e.g., first) transmission opportunity for transmitting the SR.

In one example, a first TTI is configured by the first SR configuration and a second TTI is configured by the second SR configuration. The first and second TTIs may be nearby and after a time instant that the UE determines to transmit the SR to the BS. The first TTI may be later than the second TTI in a timeline. According to the process 50, the UE may transmit the SR in the second TTI because the second TTI provides the earliest transmission opportunity.

Examples described for the process 30 may be applied to the process 50.

The following examples can be applied to the processes 30-50.

In one example, the UE transmits the first BSR in a third TTI, when the UE has a UL grant for the third TTI. That is, the UE transmits the first BSR in at least one UL radio resource configured by the UL grant. The BS transmits a DCI configuring the UL grant and indicates the UL grant for the third TTI.

In one example, the UE triggers the transmission of the first BSR, when detecting or determining (or in response to) that the data for the first LC is available for being transmitted or the data for the second LC is available for being transmitted.

In one example, the UE receives the first configuration of the first LC, the second configuration of the second LC, the first SR configuration and the second SR configuration in one or more radio resource control (RRC) messages (e.g., RRCConnectionReconfiguration messages), or in one or more medium access control (MAC) control elements from the BS. In one example, the first configuration includes at least one of a first LC identity of the first LC and the first priority of the first LC. In one example, the second configuration includes at least one of a second LC identity of the second LC and the second priority of the second LC. In one example, the first configuration is associated to a first radio bearer configuration, and the second configuration is associated to a second radio bearer configuration.

In one example, the first BSR includes a first buffer status of the first LC or of a first logical channel group (LCG) to which the first LC belongs, when the first LC has data available for being transmitted. In one example, the first BSR includes a second buffer status of the second LC or of a second LCG to which the second LC belongs, when the second LC has data (of the second LC) available for being transmitted.

In one example, the second BSR includes a third buffer status of the first LC or of the first LCG to which the first LC belongs. In one example, the second BSR includes fourth buffer status of the second LC or of the second LCG to which the second LC belongs.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE or the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a SR. Thus, the UE knows how to transmit the SR. As a result, the problem of transmitting the SR in the situation that the BSR transmission timer expires is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a schedule request (SR), comprising:
   a storage device; and
   a processing circuit, coupled to the storage device, wherein the storage device stores, and the processing circuit is configured to execute instructions of:
   receiving a first configuration of a first logical channel (LC), a second configuration of a second LC, a first SR configuration corresponding to the first LC, and a second SR configuration corresponding to the second LC from a base station (BS);
   transmitting a first buffer status report (BSR);
   starting a BSR retransmission timer (RetxBSR-Timer) in response to the transmission of the first BSR; and
   transmitting a SR to the BS according to the first SR configuration, when the RetxBSR-Timer expires, the first LC has data available for being transmitted, and a first priority of the first LC is higher than a second priority of the second LC.

2. The communication device of claim 1, wherein the instructions further comprise:
   transmitting the SR to the BS according to at least one uplink (UL) radio resource configured by the first SR configuration or the second SR configuration, if the communication device uses the first SR configuration or the second SR configuration.

3. The communication device of claim 1, wherein the instructions further comprise:
   transmitting the SR to the BS according to the second SR configuration, when the RetxBSR-Timer expires, the second LC has data available for being transmitted and the first LC does not have the data available for being transmitted.

4. The communication device of claim 1, wherein the instructions further comprise:
   determining a number of transmissions of the SR according to a counter, wherein the counter comprises a SR COUNTER.

5. The communication device of claim 1, wherein the instructions further comprise:
   not transmitting the SR to the BS, when the retxBSR-Timer expires, the first LC does not have the data available for being transmitted and the second LC does not have the data available for being transmitted.

6. The communication device of claim 1, wherein a first transmission time interval (TTI) is configured by the first SR configuration and a second TTI is configured by the second SR configuration, and the first TTI and the second TTI are after a time instant that the communication device determines to transmit the SR to the BS according to the first SR configuration.

7. The communication device of claim 6, wherein the first TTI is later than the second TTI, and the instructions further comprise:
   transmitting the SR to the BS in the first TTI according to the first SR configuration.

8. The communication device of claim 1, wherein the instructions further comprise:
 starting a first SR prohibit timer in response to the transmission of the SR.

9. The communication device of claim 1, wherein the instructions further comprise:
 receiving a UL grant transmitted by the BS in response to the transmission of the SR; and
 transmitting the first BSR to the BS in at least one UL radio resource configured by the UL grant.

* * * * *